United States Patent
Walters et al.

(10) Patent No.: US 11,755,708 B2
(45) Date of Patent: Sep. 12, 2023

(54) METHODS AND SYSTEMS FOR FACILITATING SECURE AUTHENTICATION OF USER BASED ON KNOWN DATA

(71) Applicant: Capital One Services, LLC, McLean, VA (US)

(72) Inventors: Austin Walters, McLean, VA (US); Jeremy Goodsitt, McLean, VA (US); Galen Rafferty, McLean, VA (US); Anh Truong, McLean, VA (US); Grant Eden, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 51 days.

(21) Appl. No.: 17/487,728

(22) Filed: Sep. 28, 2021

(65) Prior Publication Data

US 2022/0374508 A1 Nov. 24, 2022

Related U.S. Application Data

(63) Continuation of application No. 17/323,047, filed on May 18, 2021, now Pat. No. 11,182,468.

(51) Int. Cl.
*G06F 21/32* (2013.01)
*G06F 21/36* (2013.01)
(Continued)

(52) U.S. Cl.
CPC .............. *G06F 21/32* (2013.01); *G06F 18/22* (2023.01); *G06F 18/28* (2023.01); *G06F 21/36* (2013.01);
(Continued)

(58) Field of Classification Search
CPC ............ G06F 21/36; G06F 2221/2103; G06K 9/6215; G06K 9/6255; G06N 3/08
(Continued)

(56) References Cited

U.S. PATENT DOCUMENTS

| 11,182,468 B1 | 11/2021 | Walters et al. | |
| 2007/0130618 A1* | 6/2007 | Chen ................. | G06F 21/36 726/8 |

(Continued)

FOREIGN PATENT DOCUMENTS

| JP | 2008-257701 A | 10/2008 |
| KR | 10-2221673 B1 | 3/2021 |

OTHER PUBLICATIONS

Mohamad, "Image Based Authentication Using Zero-Knowledge Protocol" IEEE 2018 (Year: 2018).*
(Continued)

*Primary Examiner* — Mark Roz
(74) *Attorney, Agent, or Firm* — Perkins Coie LLP

(57) ABSTRACT

Methods and systems are described herein for improvements to authenticate users, particularly authenticating a user based on data known to the user. For example, methods and systems allow for users to be securely authenticated based on data known to the users over remote communication networks without storing the data known to the users. Specifically, methods and systems authenticate users by requiring users to select images that are known to the users. For example, the methods and systems may generate synthetic images based on the user's own images and require the user to select the synthetic image, from a set of a set of images, that is known to the user to authenticate the user. Moreover, the methods and systems alleviate storage and privacy concerns by not storing the data known to the users.

20 Claims, 5 Drawing Sheets

(51) Int. Cl.
*G06N 3/08* (2023.01)
*G06V 10/764* (2022.01)
*G06V 10/82* (2022.01)
*G06F 18/22* (2023.01)
*G06F 18/28* (2023.01)
*G06V 10/772* (2022.01)
*G06V 10/94* (2022.01)
*G06V 40/10* (2022.01)

(52) U.S. Cl.
CPC ............. *G06N 3/08* (2013.01); *G06V 10/764* (2022.01); *G06V 10/772* (2022.01); *G06V 10/82* (2022.01); *G06V 10/945* (2022.01); *G06V 40/10* (2022.01); *G06F 2221/2103* (2013.01)

(58) Field of Classification Search
USPC .............................................................. 726/2
See application file for complete search history.

(56) References Cited

U.S. PATENT DOCUMENTS

| | | | | |
|---|---|---|---|---|
| 2007/0277224 | A1* | 11/2007 | Osborn | ................... G06F 21/36 726/2 |
| 2010/0043062 | A1* | 2/2010 | Alexander | ............ H04L 9/3226 726/6 |
| 2014/0130148 | A1* | 5/2014 | Sako | ....................... G06F 21/36 726/19 |
| 2020/0356653 | A1* | 11/2020 | Cho | ..................... G06V 40/172 |

OTHER PUBLICATIONS

Ramesh, "Zero-Shot Text-to-Image Generation", Feb. 2021 (Year: 2021).*
International Search Report and Written Opinion issued in corresponding International Application No. PCT/US2022/028481 dated Aug. 19, 2022 (10 pages).

* cited by examiner

METHODS AND SYSTEMS FOR FACILITATING SECURE AUTHENTICATION OF USER BASED ON KNOWN DATA

CROSS-REFERENCE TO RELATED APPLICATION(S)

This application is a continuation of U.S. patent application Ser. No. 17/323,047, filed May 18, 2021. The content of the foregoing application is incorporated herein in its entirety by reference.

BACKGROUND

In recent years, users have been able to access content from exponentially more devices and in exponentially more locations. However, as users are able to access content on these devices and from these locations there is a need to ensure that users only access content that they are authorized to access. Conventional systems such as passwords and pin codes require users to remember these passwords and pin codes. Additionally, these passwords and pin codes may be learned by unauthorized users resulting in those unauthorized users being able to access the content of a user.

SUMMARY

Methods and systems are described herein for an improved mechanism for authenticating users. In particular, the methods and systems facilitate secure authentication of users based on data known to the user. By doing so, the methods and systems provide secure authentication without requiring users to remember these passwords and pin codes as well as ensure that unauthorized users are not able to access the content of a user if the unauthorized users learn the authorized user's passwords and pin codes. Specifically, the methods and systems authenticate users by requiring users to select images that are known to the user (e.g., images from a user's phone, social media profile, etc.).

However, the use of images that are known to the user (e.g., images from a user's phone, social media profile, etc.) creates additional privacy and storage concerns. For example, in order to use images that are known to the user, the system must store those images, which not only raises privacy concerns, but also increases the amount of data that the system must store. Additionally, the images that are known to the user may contain sensitive data (e.g., the user's kids, home address, place of work, other identifying features, etc.) that may also raise additional privacy concerns. Furthermore, as the resolution of images exponentially increases, the amount of data that must be stored for a single image increases as well.

To solve these technical problems, the methods and systems recite the use of generative models to create synthetic images based on user's own images. As the system creates synthetic images, the system does not need to store the user's own images (e.g., relieving the storage burden that those images create) as well as ensuring that the user's privacy is not violated through the storage of those images or the synthetic images containing sensitive data. However, as the synthetic images are based on the user's own images, the user is able to identify the synthetic images. That is, the user is able to select the synthetic images that are known to the user. For example, the system may retrieve a plurality of images of the user's cats. The system may then train a generative model to create images of cats based on the plurality of images. As the generative model is tasked with creating similar images, each of the synthetic images may resemble one of the user's cats as opposed to cats in general (e.g., if the user has grey cats, the generative model may create images of grey cats). After the system has trained the generative model, the system no longer needs to store the plurality of images and can delete them—saving data storage space and alleviating any privacy concerns. Notably, the generative model may require substantially less space for storage than the plurality of images.

The system may then use one of the synthetic images along with other images as an authentication mechanism for the user. That is, the system may require the user to select which one of a plurality of images of cats resembles the user's own cat. Accordingly, the methods and systems overcome the aforementioned technical problems as well as provide an improved mechanism for authenticating users beyond those of conventional systems.

In some aspects, methods and systems for facilitating secure authentication of users based on data known to the users over remote communication networks without storing the data known to the users are described. For example, the system may retrieve, via a user device, a first plurality of images corresponding to a first user. The system may categorize the first plurality of images into a plurality of categories, wherein the first plurality of images is categorized into the plurality of categories based on objects depicted in the first plurality of images. The system may select a category from the plurality of categories. The system may retrieve, via the user device, a first generative model corresponding to the category, wherein the first generative model is trained using the first plurality of images to generate synthetic images representing images that correspond to the category's images. The system may generate a first subset of synthetic images using the first generative model. The system may generate for display, on the user device, a set of images to the first user, wherein the set of images includes a first synthetic image of the first subset of synthetic images and a second synthetic image that is not of the first subset of synthetic images. The system may receive a first user input selecting the first synthetic image. The system may, in response to the first user input, authenticate the first user.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention. It should also be noted that the methods and systems disclosed herein are also suitable for applications unrelated to authenticating users based on known data.

Figure 1:
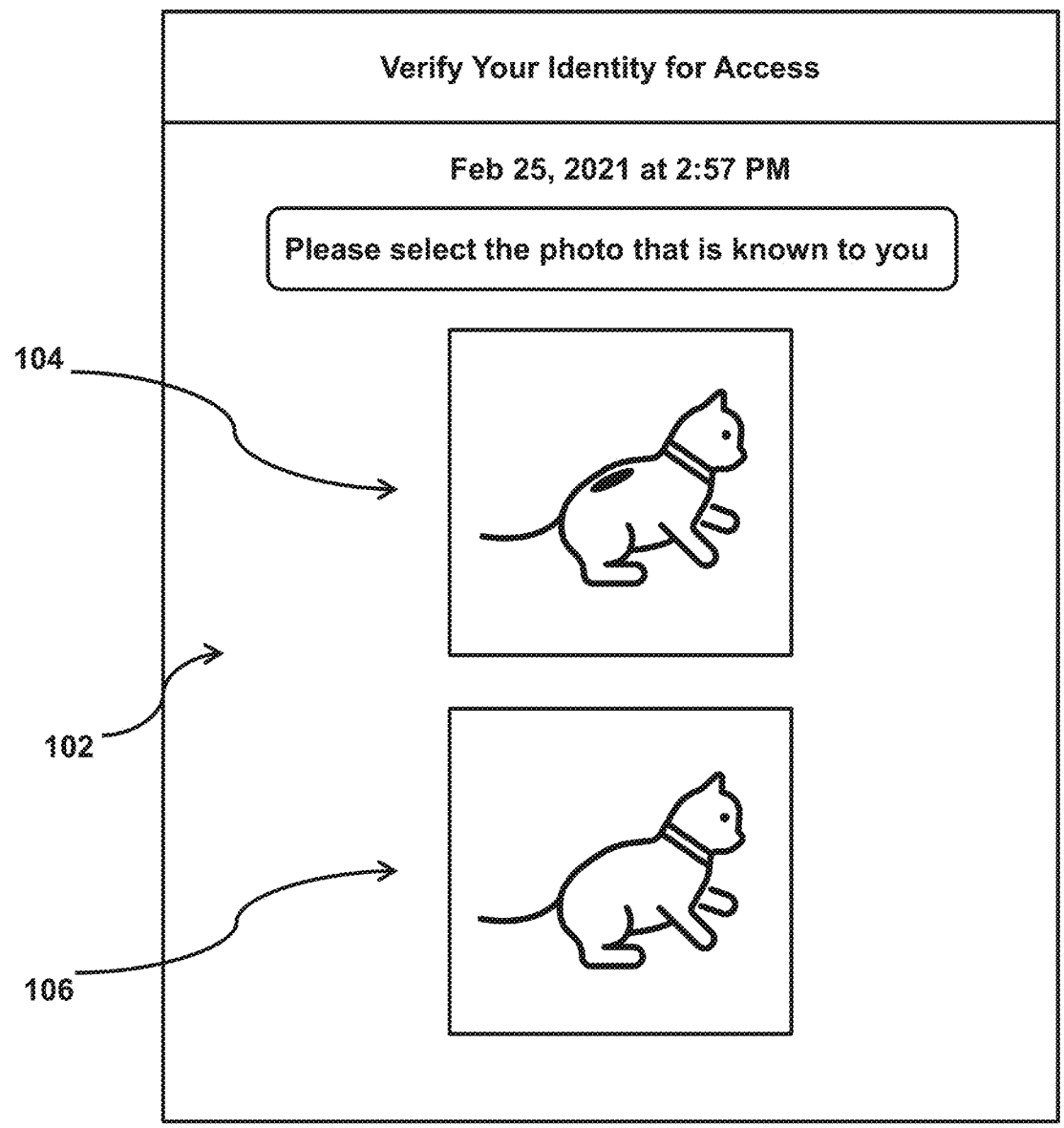
FIG. 1 shows an illustrative user interface for facilitating secure authentication of users based on data known, in accordance with one or more embodiments.

FIG. 1 shows an illustrative user interface for facilitating secure authentication of users based on data known, in accordance with one or more embodiments. For example, FIG. 1 shows a user interface 100. User interface 100 may correspond to a user interface generated for display by a user device (which in some embodiments may correspond to user device 322 (FIG. 3) and/or user terminal 324 (FIG. 3)). The user interface may allow a user to view a set of images 102 (e.g., synthetic images, generated images, fake images, real images, normal images, etc.) and select an image that is known to the user. For example, a first synthetic image 104 and a second synthetic image 106 may be displayed on user interface 100. The user may identify that the first synthetic image 104 is known to the user and that the second synthetic image 106 is not known to the user. In response to the user selecting the first synthetic image 104 that is known to the user, the system may authenticate the user.

For example, the system may generate the first synthetic image 104 and the second synthetic image 106 such that the first synthetic image 104 and the second synthetic image 106 are similar but not identical. For instance, the system may generate the first synthetic image 104 based on images that correspond to the user (e.g., images from the user's device, social media account, computer application, etc.) and the system may further generate the second synthetic image 106 based on images that do not correspond to the user but are similar to the user's own images. For example, the system may categorize images corresponding to the user and select a category of images based on what is depicted in the images (e.g., pets, children, place of work, a visited location, food, etc.). The system may generate the first synthetic image 104 using one or more generative models (which in some embodiments may correspond to the first generative model system 200 (FIG. 2), the second generative model system 250 (FIG. 2), autoencoder 400 (FIG. 4), or generative adversarial network (GAN) 450 (FIG. 4)) based on the selected category and images that correspond to user's own images. Furthermore, the system may generate the second synthetic image 106 using one or more generative models (which in some embodiments may correspond to the first generative model system 200 (FIG. 2), the second generative model system 250 (FIG. 2), autoencoder 400 (FIG. 4), or generative adversarial network (GAN) 450 (FIG. 4)) based on the selected category and images that do not correspond to the user's own images. In this way, the user may be able to select the first synthetic image 104 to authenticate themself for access to the user's private content by identifying an image that resembles data known to the user. In this case, the user would know that the first synthetic image 104 is a known image, and that the second synthetic image 106 is an unknown image based on the respective synthetic images being generated based on the user's own images versus not the user's own images.

For example, the first synthetic image 104 that is known to the user may resemble an image of the user's own cat. For instance, the user's own cat may have a physical characteristic (e.g., a spot, collar, weight, size, stature, shape, etc.) that is recognizable by the user in comparison to other images of cats. The second synthetic image 106 may be a similar image of a cat but not the user's own cat. For instance, the spot of the user's real cat may be considered a physical characteristic of the user's cat that helps the user identify an image of the set of images 102 that is known to the user. In this way, the user trying to gain access to their content may be authenticated by selecting the first synthetic image 104 based on a recognizable physical characteristic that is known to the user. In this case, the user would know that the first synthetic image 104 that shows a spot on the cat corresponds to the user's own images of their cat and that the second synthetic image 106 may merely be a similar cat, but is not known to the user (e.g., based on the similar cat lacking the spot of the user's real-life cat).

However, in order to alleviate privacy concerns, the first synthetic image 104 may not be identical to an original corresponding image of the user's own personal images. For example, the spot shown in the first synthetic image 104 of the user's own cat may be in a different location, a different size, or a different color, as compared to an original corresponding image of the user's cat (e.g., a real image of the user's cat). In this way, sensitive data included in the original images (in which the first generative may be trained on) may be protected such that an unauthorized user may not gain knowledge about the user in which they are trying to gain access to their private content. In other words, an unauthorized user may not gain knowledge of the authentic user's pet cat.

As another example, the first synthetic image 104 may represent a location where a user may live. In this case, certain identifying features present in an original corresponding image of the user's own images (such as a street addresses, buildings, or other environmental features) may be altered, changed, or hidden to address the aforementioned privacy concerns such that an unauthorized user may not gain sensitive knowledge about the user in which they are trying to gain access to their content. In other words, an unauthorized user may be prevented from gaining additional information about the user whose account they are trying to gain access to.

As another example, in the case where an unauthorized user is trying to access the user's content, the set of images 102 displayed to the unauthorized user may confuse the unauthorized user based on the first synthetic image 104 and the second synthetic image 106 being similar. Furthermore, the unauthorized user would not (or should not) know in advance if the user's cat has a spot or not. Thus, the system may achieve secure authentication of users based on data known to the user because unauthorized users may not be privy to details about the authorized user's images.

Figure 2:
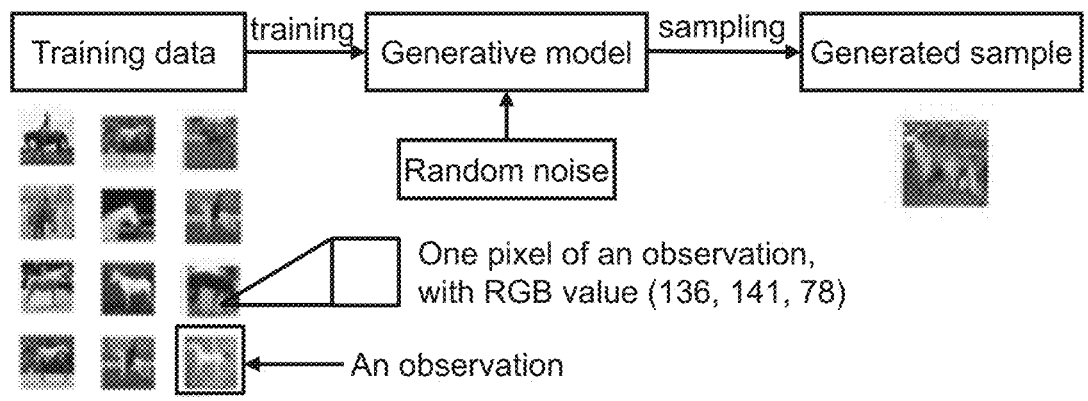
FIG. 2 shows an illustrative diagram for facilitating secure authentication of users based on data known, in accordance with one or more embodiments.
Figure 2:
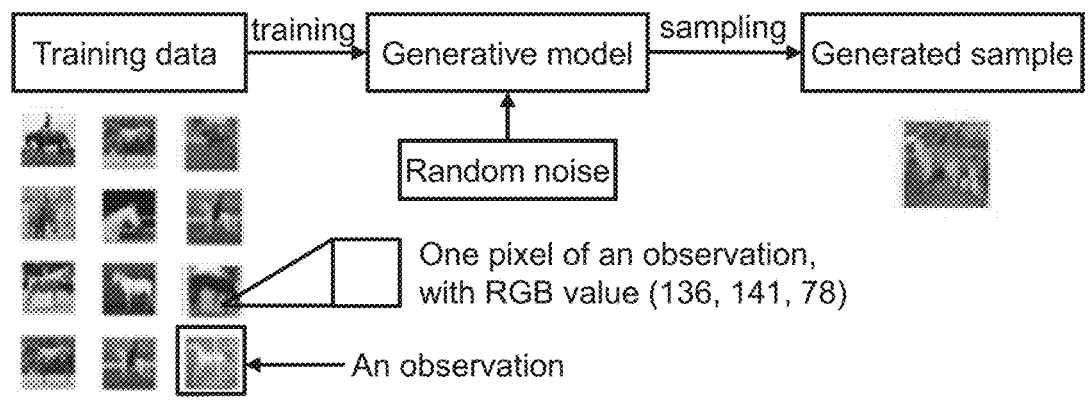

FIG. 2 shows an illustrative diagram for facilitating secure authentication of users based on data known, in accordance with one or more embodiments. For example, FIG. 2 shows a first generative model system 200 and a second generative model system 250. The first generative model system 200 and the second generative model system 250 each comprise training data (e.g., images), a training data module, a generative model, random noise, and a generated sample. The first generative model system 200 and the second generative model system 250 comprise these components to help facilitate secure authentication of users based on known data by generating synthetic images. In some embodiments, the first generative model system 200 and the second generative model system 250 may comprise additional components not shown in FIG. 2.

In some embodiments, the first generative model system 200 may be trained using images that correspond to user's own personal images. For example, the images may be images personal to the first user (e.g., a location the first user has visited, food the first user has eaten, the first user's children, the first user's family, the first user's pets, etc.). By way of example, the images may be of the first user's son. The first generative model system 200 may be trained to identify features of the first user's son and use those features to generate synthetic images that represent the first user's son.

In some embodiments, the first generative model system 200 may generate similar but not identical images of the training data supplied to the first generative model system. As an example, the first generative model system 200 may be trained on images corresponding to a first user and the images may be images of the first user's son. The first generative model system 200 may identify features of the first user's son and generate synthetic images that are similar but not identical to an original (e.g., real) corresponding image of the first user's son. These similar (but not identical) synthetic images are images that correspond to an original image of the first user, but may have certain identifying features removed, recolored, relocated, or otherwise altered such that the synthetic image is not identical to the corresponding original image, but is still able to be known to the first user. By way of example, the first generative model system 200 may be trained to generate synthetic images that are similar to the first user's own images, for example, images of the first user's son. The first user's son may have identifying features of dark spikey hair, green eyes, and being a tall child. The first generative model system 200 may identify these identifying features of the first user's son and may generate a synthetic image with similar identifying features. The generated synthetic image may be similar but not identical to the original corresponding image of the first user's son such that the generated synthetic image may change the hair color to a lighter color, but keep the spikey hair, the green eyes, and the tall height of the child. Additionally or alternatively, the generated synthetic image may only change the color of the first user's son's eyes to blue and keep the rest of the identifying features intact. Similarly, the generated synthetic image may depict more than one identifying feature as changed such that the generated synthetic image changes the hair to be smooth and makes the child shorter. Nonetheless, the first user is still able to recognize the synthetic image as an image known to the first user even though some of the identifying features have been altered from the original corresponding image. In this way, the system may preserve sensitive data in the first plurality of images corresponding to the first user, such that an unauthorized user trying to gain access to the first user's content may not gain additional knowledge of the first user via similar synthetic images.

Additionally or alternatively, as shown in FIG. 2 the second generative model system 250 may be trained using images that correspond to a second user's own personal images. For example, the images may be images personal to the second user (e.g., a location the second user has visited, food the second user has eaten, the second user's children, the second user's family, the second user's pets etc.). By way of example, the images may be of the second user's son. The second generative model system 250 may be trained to identify features of the second user's son and use those features to generate synthetic images that represent the second user's son. In this way, when user interface 100 presents first synthetic image 104 and second synthetic image 106 to the first user, the first user may select the first synthetic image for authentication based on data known to the first user. For example, the first synthetic image 104 may be the generated synthetic image of the first user's son, and the second synthetic image 106 may be the generated synthetic image of the second user's son. The first user may select the first synthetic image 104 for authentication. Similarly, an unauthorized user may be prevented from accessing the first user's content due to not knowing which image is the "correct" image to select, or otherwise which image of the set of images 102 is the data known to the first user.

Figure 3:
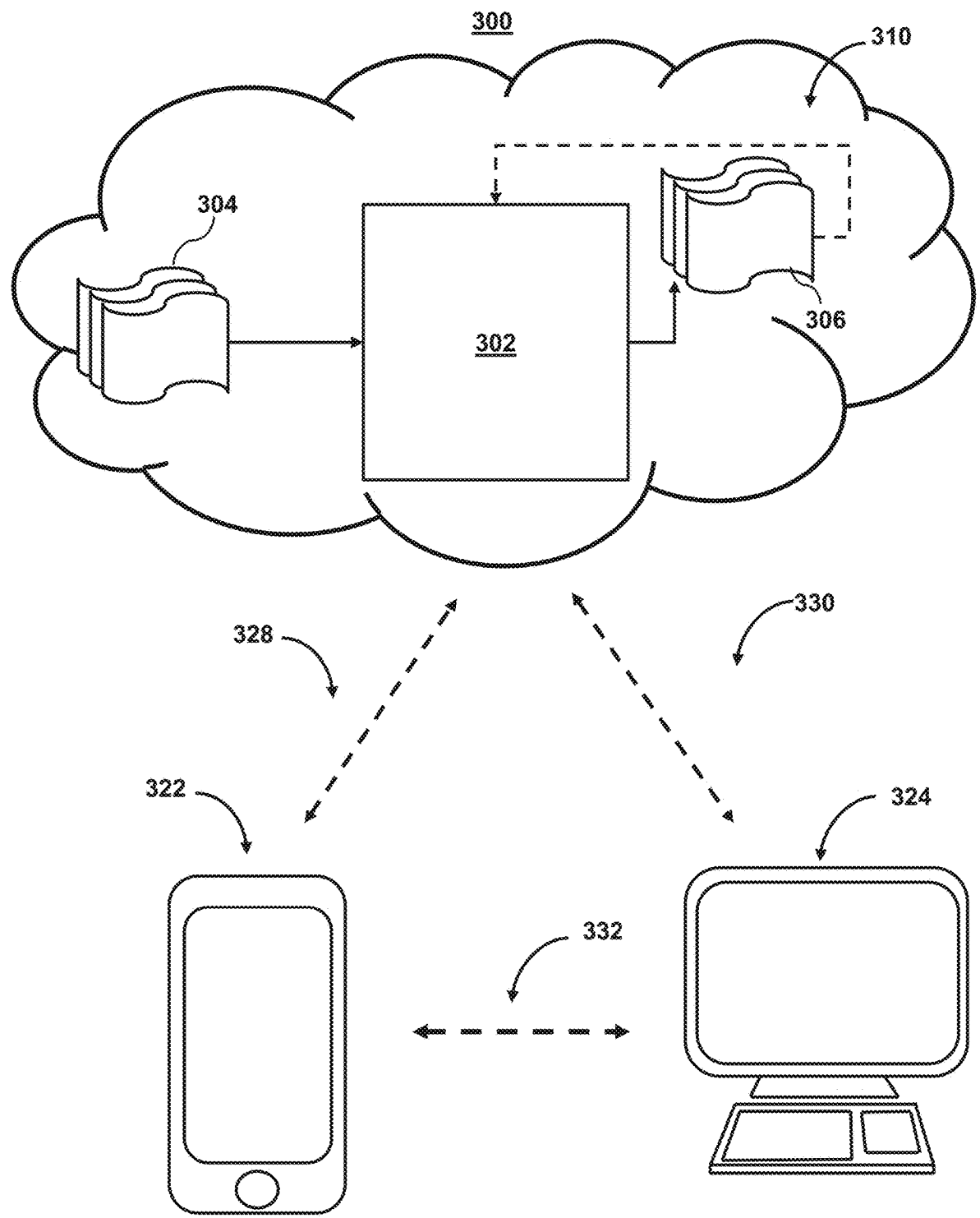
FIG. 3 shows a system diagram for components used to facilitate secure authentication of users based on data known, in accordance with one or more embodiments.

FIG. 3 shows system diagram for components used to facilitate secure authentication of users based on data known, in accordance with one or more embodiments. As shown in FIG. 3, system 300 may include user device 322 and user terminal 324 (which in some embodiments may be used to display user interface 100 (FIG. 1)). While shown as a smartphone and personal computer, respectively, in FIG. 3, it should be noted that user device 322 and user terminal 324 may be any computing device, including, but not limited to, a laptop computer, a tablet computer, a hand-held computer, other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. It should also be noted that system 3(X) is not limited to three devices. Users may, for instance, utilize one or more devices to interact with one another, one or more servers, or other components of system 300. It should be noted that, while one or more operations are described herein as being performed by particular components of system 300, those operations may, in some embodiments, be performed by other components of system 300. As an example, while one or more operations are described herein as being performed by components of user device 322, those operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of user device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both user device 322 and user terminal 324 include a display upon which to display data (e.g., as shown in FIG. 1).

Additionally, as user device 322 and user terminal 324 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 300 may run an application (or another suitable program). The application may cause the processors and/or control circuitry to perform operations related to generating alternative content.

Each of these devices (e.g., user device 322 and user terminal 324) may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user data for a user. For example, the database may include user data that the system has collected about the user through prior interactions, both actively and passively. Alternatively, or additionally, the system may act as a clearing house for multiple sources of information about the user. This information may be compiled into a cross-platform profile. For example, one or more of cloud components 310 may include a microservice and/or components thereof. In some embodiments, the microservice may be a collection of applications that each collect one or more of the plurality of variables.

Cloud components 310 may include model 302, which may be a machine learning model. Model 302 may take inputs 304 and provide outputs 306. The inputs may include multiple datasets such as a training dataset and a test dataset. Each of the plurality of datasets (e.g., inputs 304) may include data subsets related to user data, original content, and/or alternative content. In some embodiments, outputs 306 may be fed back to model 302 as inputs to train model 302. For example, the system may receive a plurality of images from a first user. The system may then train the first machine learning model to generate synthetic images representing images that correspond to the first user. As another example, model 302 may be a model stored in cloud storage of cloud components 310 for retrieval. In such embodiments, model 302 may correspond to Generative Adversarial Network (GAN) 450 (FIG. 4) as described in the following paragraphs.

In another embodiment, model 302 may update its configurations (e.g., weights, biases, or other parameters) based on the assessment of its generated synthetic images (e.g., outputs 306) and reference feedback information (e.g., user indication of accuracy, reference labels, or other information). In another embodiment, where model 302 is a neural network, connection weights may be adjusted to reconcile differences between the neural network's output and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

In some embodiments, model 302 may be an autoencoder (AE) or variational autoencoder (VAE). In such embodiments, model 302 may be an AE or VAE that is stored in cloud components 310 for later retrieval. For example, in such embodiments, model 302 may correspond to AE 400 (FIG. 4) as described in the following paragraphs.

Figure 4:
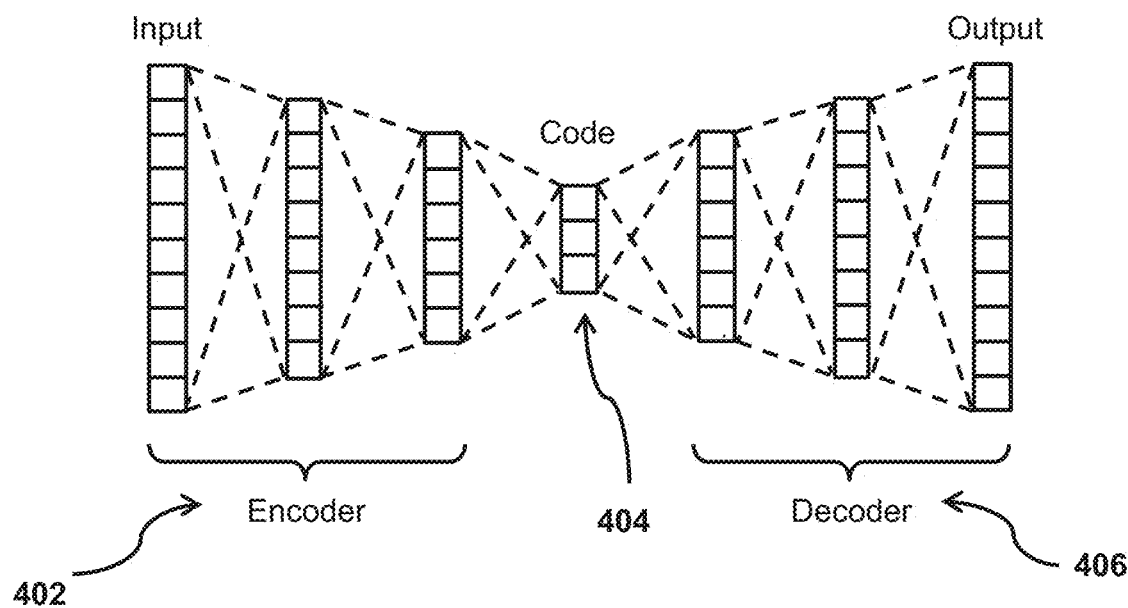
FIG. 4 shows a system diagram for a plurality of generative models used to facilitate secure authentication of users based on data known, in accordance with one or more embodiments.
Figure 4:
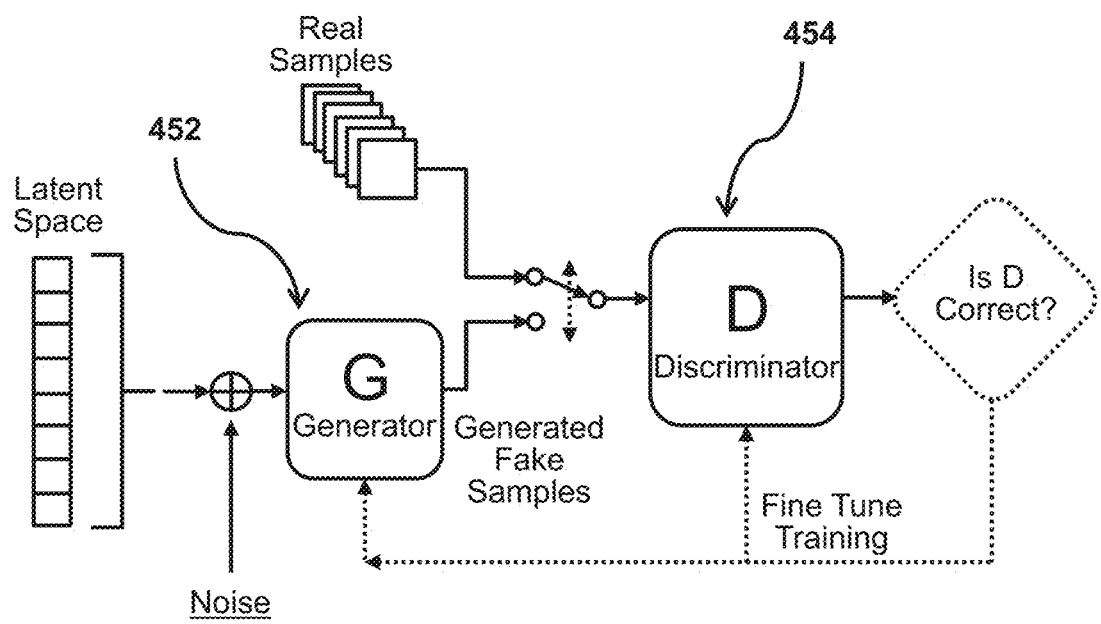

FIG. 4 shows a system diagram for a plurality of generative models used to facilitate secure authentication of users based on data known, in accordance with one or more embodiments. For example, FIG. 4 shows an autoencoder 400 and a generative adversarial network (GAN) 450. For example, an autoencoder (AE) 400 or variational auto encoder (VAE) may be trained to generate synthetic images. The AE 400 may be a neural network that may encompass an encoder that maps the input into the code, and a decoder that maps the code to a reconstruction of the original input. The AE 400 may include one or more hidden layers that describe a code used to represent the input and learn to copy the input to the output. A VAE may be a generative model that includes an encoder, a decoder, and a loss function. The VAE may be trained though its loss function and the aim of the autoencoder may be to select the encoder and decoder functions in such a way that it requires minimal information to encode the image such that it can be regenerated on the other side. For example, if there are too few nodes in the bottleneck layer (the smallest layer in the network), the capacity to recreate the images may be limited and the regenerated images may be blurry or unrecognizable from the original. If there are too many nodes in the bottleneck layer, then there may be little point in using compression at all. As such, the loss functions and model parameters such as the number of nodes in the bottleneck layer may be tuned to generate images with expected noise and blurriness.

As another example, autoencoder 400 may include an encoder 402, a code layer 404, and a decoder 406. Both the encoder 402 and decoder 406 are fully connected feedforward artificial neural networks. The code layer 404 is a single layer of an artificial neural network with a dimensionality of choice. For example, the code layer 404 may include a plurality of nodes (e.g., code size) that may be a predetermined number of nodes. The autoencoder 400 operates by providing inputs through the input layer of the encoder 402 to generate code data in the code layer 404. The decoder 406 then uses the code data from the code layer 404 to generate an output that is identical to the input. In some embodiments, the decoder 406 may use the code data to generate an output that is similar to the input, but not identical to the input. Once the decoder 406 has generated an output, the autoencoder 400 may be trained via backpropagation to update its parameters or weights.

As shown in FIG. 4, a Generative Adversarial Network (GAN) 450 may be a class of machine learning systems that may include a generator 452 and a discriminator 454, which may compete against each other in a zero-sum game. Generator 452 or discriminator 454 may each be an artificial neural network, which may be a collection of connected nodes, with the nodes and connections each having assigned weights used to generate predictions. Each node in the artificial neural network may receive inputs and generate outputs. The output of a node in the artificial neural network may be a function of its inputs and the weights associated with the edges. Generator 452 may generate new data instances based on a training dataset such as ground truth images, while discriminator 454 may evaluate them for authenticity. For example, discriminator 454 may decide whether each instance of data that it reviews belongs to the actual training dataset or not.

Meanwhile, generator 452 may create new, synthetic images that it passes to discriminator 454 in the hopes that these new synthetic images will be deemed authentic, even though they are fake. The goal of generator 452 may be to generate passable synthetic images and the goal of the discriminator 454 may be to identify images coming from the generator as fake.

As another example, generator 452 may take a random sample from a training data set (e.g., a latent space) and generate a new image by randomly altering features (e.g., adding random noise) of the sample from the training data set. For instance, generator 452 may take an image of dog and add an extra ear to the image which will be considered a fake sample. Although the generated image is similar to the sample from the training set, the extra ear indicates the generated image as a fake sample by the generator. Discriminator 454 may be provided a mix of real samples of images (e.g., ground truth images) as well as fake samples of images generated by generator 452. The discriminator 454 is burdened with the task of identifying which images of the provided images are real and which ones are fake. Based on the outcome of classifying which images of the provided images are real and which ones are fake, the generator 452 and the discriminator 454 may each update their parameters. The updating of their respective parameters may cause the generator 452 to generate better synthetic data that will be passed as authentic or real images, while the discriminator 454 may be able to better identify which provided images are real and which ones are fake. For example, discriminator 454 may correctly predict that a generated image is a fake sample, and the generator 452 may update its parameters to generate better samples of images that will be passed as real images. Furthermore, discriminator 454 may incorrectly predict that a generated image is a real sample, and the discriminator 454 may update its parameters such that the discriminator 454 may be able to better identify future samples of fake images. This process of updating the parameters of the generator 452 and the discriminator 454 may continue until an equilibrium is established and the discriminator 454 is optimized.

Figure 5:
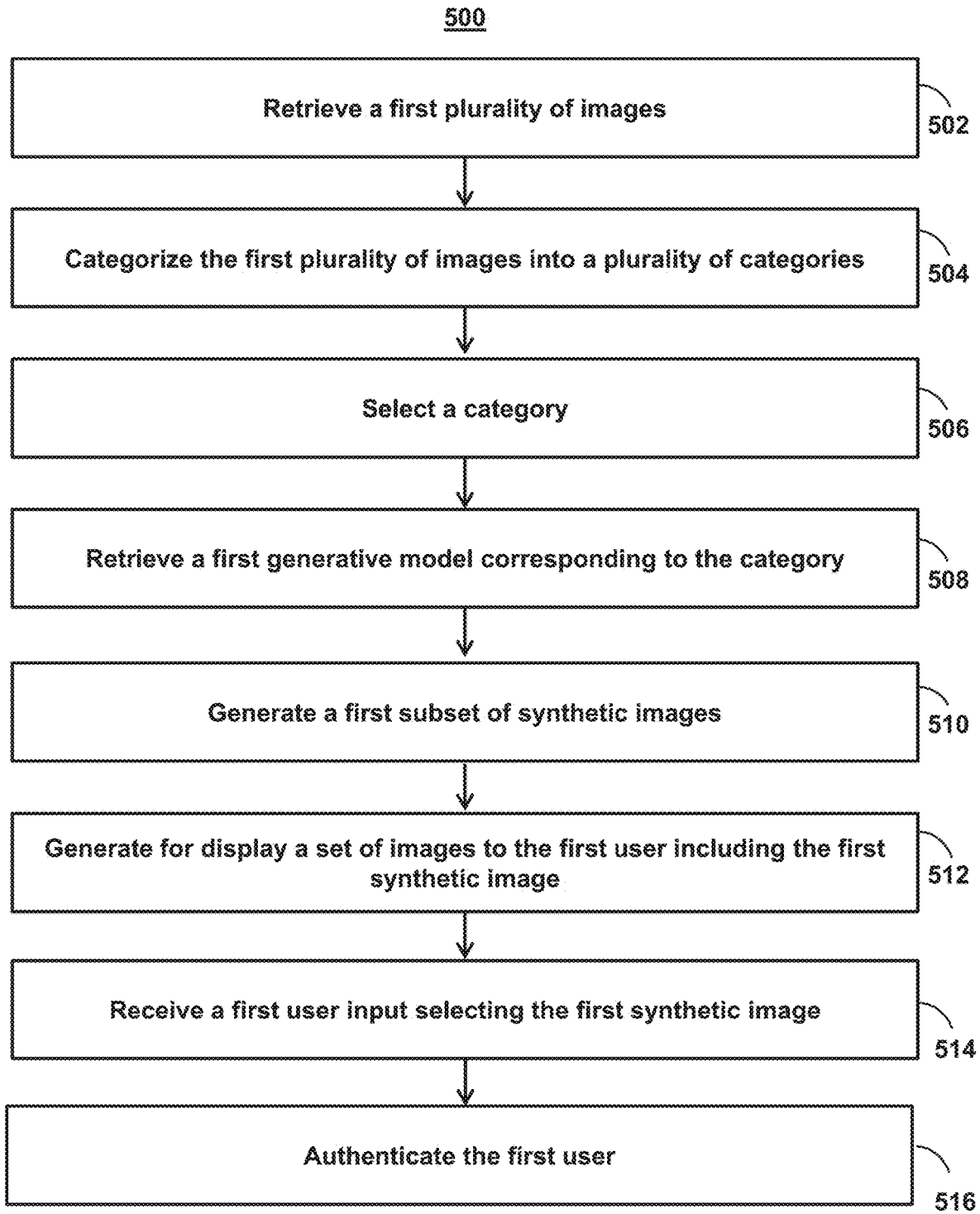
FIG. 5 shows a flowchart of steps for facilitating secure authentication of users based on data known, in accordance with one or more embodiments.

FIG. 5 shows a flowchart of steps for facilitating secure authentication of users based on data known, in accordance with one or more embodiments. For example, process 500 may represent the steps taken by one or more devices as shown in FIGS. 1-4. For example, process 500 may be performed by an authentication system that includes a memory configured to store a plurality of generative models and a plurality of images, control circuitry, and I/O circuitry. In some embodiments, process 500 may represent the steps taken for facilitating secure authentication of users based on data known to the users over remote communication networks without storing the data known to the users.

At step 502, process 500 retrieves (e.g., using one or more components of system 300 (FIG. 3)) a first plurality of images. For example, the system may retrieve, via a user device, a first plurality of images corresponding to a first user. For example, the first plurality of images corresponding to the first user may be the first user's own personal images. For instance, the system may retrieve social media profile data corresponding to the first user. The system may then retrieve images corresponding to the social media profile data, and determine, based on the images corresponding to the social media profile data, the first plurality of images. In this way, the first plurality of images corresponds to the first user such that the first plurality of images are the first user's own personal images and may help prevent unauthorized users from accessing the first user's content because the unauthorized user would not know the first user's personal images.

Additionally or alternatively, the system may retrieve, via a user device, the first plurality of images corresponding to the first user based on when the images were taken. For example, the system may determine a set of available images corresponding to the first user. The system may then determine a respective time stamp for each image of the set of available images and filter each image of the set of available images based on the respective time stamp to determine the first plurality of images. For instance, the system may determine a set of available images corresponding to the first user by retrieving from a memory associated with the user device, a social media account corresponding to the first user, an application corresponding to the first user, a cloud-based memory corresponding to the first user, or an online resource corresponding to the first user. For example, each image of the set of available images may include metadata that indicates information associated with a particular image. This metadata may include information such as a date the image was taken, a time the image was taken, how large of a file the image is, if the image has been altered, previous version history, and other information. The system may use the metadata associated with each image of the set of available images to determine a respective time stamp (e.g., a time and/or date the image was taken) for each image of the set of available images. The system may then filter the set of available images based on the respective time stamps for each image of the set of available images.

For example, the system may filter the set of available images such that the filtered images are the most recently added images. For instance, the system may parse through the metadata of each image of the set of available images and order each image based on the date and the time the images were taken. For example, the system may select an image of the set of available images and compare the selected image's date and time taken to all of the set of available images dates and times taken and repeat this process until all of the images of the set of available images are ordered based on the date and time taken. The system may then take a portion of the ordered images to determine the first plurality of images. For example, the system may determine the first plurality of images by selecting one or more images of the set of the ordered images based on the images being most recently added (e.g., the newest images). As another example, the system may determine the first plurality of images by determining how many images of the set of available images are present. The system may then determine the first plurality of images, based on how many images of the set of available images are present, and take a portion of the images such that the portion of the images are a fraction ($\frac{1}{16}$th, $\frac{1}{8}$th, $\frac{1}{4}$th, $\frac{1}{3}$rd, $\frac{1}{2}$, etc.) of the set of available images and are the most recently added images based on the image's date. In this way, the first plurality of images corresponds to the first user such that the first plurality of images are the most recent images captured and this may prevent unauthorized users from accessing the first user's content by the unauthorized user not knowing the most recent images the first user has captured.

As another example, the system may filter the set of available images such that the filtered images are the oldest images present in the set of available images. For instance, the system may determine the first plurality of images by selecting one or more images of the set of the ordered images based on the images being the oldest images. As another example, the system may determine the first plurality of images by determining how many images of the set of available images are present. The system may then determine the first plurality of images, based on how many images of the set of available images are present, and take a portion of the images such that the portion of the images are a fraction ($\frac{1}{16}$th, $\frac{1}{8}$th, $\frac{1}{4}$th, $\frac{1}{3}$rd, $\frac{1}{2}$, etc.) of the set of available images and are the oldest images of the set of available images based on the image's date. In this way, the first plurality of images corresponds to the first user such that the first plurality of images are the oldest images captured and this may prevent unauthorized users from accessing the first user's content by the unauthorized user not knowing the oldest images the first user has captured.

At step 504, process 500 categorizes (e.g., using one or more components of system 300 (FIG. 3)) the first plurality of images into a plurality of categories. For example, the system may categorize the first plurality of images into a plurality of categories, wherein the first plurality of images is categorized into the plurality of categories based on objects depicted in the first plurality of images. For example, the system may use a machine learning model (e.g., a GAN, an AE, a VAE, an Artificial Neural Network, a Convolutional Neural Network, a Decision Tree, Support Vector Machines, K-Means etc.) to classify images based on objects depicted in the first plurality of images. For example, the first plurality of images may be categorized into the plurality of categories based on a setting, an environment, an animal, a person, a food, a place, an item, or other objects depicted in the first plurality of images. For instance, the system may utilize a machine learning model to extract features in the first plurality of images. The machine learning model may learn these extracted features to determine the identity of a particular object present in the first plurality of images. For instance, the machine learning model may associate a particular feature with the identity of a particular object by comparing extracted features from ground truth images and known objects. For example, an image depicting a guitar may include features such as guitar strings, a guitar neck, and a guitar body. The machine learning model may associate the features (e.g., guitar strings, guitar neck, and guitar body) to the image representing a guitar. Thus, the machine learning model identifies the image as being a guitar and can classify the image as such. As another example, the system may cluster objects in the first plurality of images and determine a category that each of the objects belong to. For instance, if an image of the plurality of images depicts a bowl of cereal, a knife, and a spoon, then the system may determine that the image belongs to a "food" category. As another example, if another image of the plurality of images depicts a puppy and an outdoor setting, the system may determine that the other image belongs to a "pet" category.

Additionally or alternatively, the system may use a GAN mode, AE, or VAE model to categorize the first plurality of images by extracting objects depicted in the first plurality of images and categorizing the images based on a number of the same objects being depicted in the images. For example, the first plurality of images may depict multiple images of the same puppy but may only depict images of a different puppy a limited number of times (e.g., only once, only twice, etc.). The system may determine that the same puppy is present in the first plurality of images more than the different puppy, thus, the same puppy may be categorized into a "pet" category while the different puppy may be categorized into a general "animal" category.

At step 506, process 500 selects (e.g., using one or more components of system 300 (FIG. 3)) a category. For example, the system may select a category from the plurality of categories. For example, the system may retrieve the plurality of categories of the first plurality of images. The system may then determine a number of images included in each category of the plurality of categories. Furthermore, the system may then select a category of the first plurality of images, wherein the category is selected based on the number of images included in the category being greater than a pre-determined number of images. In this way, the system may select the category based on the number of images corresponding to a respective category such that the system may generate synthetic images that resemble the user's own personal images more closely (e.g., by having a greater number of images to later train a generative model to generate the synthetic images). As another example, the system may select a category of the first plurality of images such that the number of images included in the category is less than a pre-determined number of images. In this way, the system may select the category such that the category has a sense of uniqueness to it. For instance, the system selecting a category with a small number of image samples may generate synthetic images such that an unauthorized user may not know specific details of images that an authentic user has taken. For example, only a small amount of evidence may exist that a first user took a trip to Germany (e.g., small number of images of Germany) and an unauthorized user trying to access the first user's content may not have any knowledge of the first user's trip to Germany. Thus, the unauthorized user may have a hard time guessing which image of the set of images presented during authentication is the correct image to select.

At step 508, process 500 retrieves (e.g., using one or more components of system 300 (FIG. 3)) a first generative model corresponding to the category. For example, the system may retrieve, via the user device, a first generative model corresponding to the category, wherein the first generative model is trained using the first plurality of images to generate synthetic images representing images that correspond to the category's images. For instance, the first generative model may be a GAN, AE, VAE, or other generative machine learning model. The first generative model, in some embodiments, may correspond to AE 400 or GAN 450 of FIG. 4. In some embodiments, the system may retrieve the first generative model from a user device, a user terminal, or even a cloud service. Furthermore, the first generative model may correspond to the category as described above. For example, the first generative model may correspond to the category of puppies, such that the first generative model generates general images of puppies. As another example, the first generative model may correspond to the category of locations (e.g., locations visited, place of work, home address, etc.). Moreover, the first generative model may be trained using the first plurality of images such that the first generative model generates synthetic images representing images that correspond to the category's images. For example, the first generative model may correspond to the category of puppies, and the first plurality of images may also correspond to the category of puppies. In this way, the first generative model may be trained to generate synthetic images that look like the user's own puppy as compared to general images of puppies. In this way, the first user may select the first synthetic image (for authentication) based on the first synthetic image representing a puppy known to the first user (e.g., his own personal puppy) as compared to a general puppy (e.g., unknown to the first user)

Additionally or alternatively, the system may retrieve, a second generative model corresponding to the category, wherein the second generative model is trained using a second plurality of images to generate synthetic images representing images that correspond to the category's images, wherein the second plurality of images corresponds to a second user. For instance, the second generative model may be a GAN, AE, VAE, or other generative machine learning model. The second generative model, in some embodiments, may correspond to the second generative model system 250 of FIG. 2. Furthermore, the second generative model may correspond to the category as described above. For example, the category for the second generative model may be the same or different as to the category selected for the first generative model. For instance, the first and second generative models may correspond to the category of a cat, or the first generative model may correspond to the category of a cat and the second generative model may correspond to the category of a dog. The second generative model may be trained using the second plurality of images such that the second plurality of images corresponds to the category and second plurality of images corresponds to the second user. In this way, the second generative model is trained based on images that correspond to the category and the second user in an effort to generate similar synthetic images as to the first generated synthetic images—thereby confusing an unauthorized user from accessing the first user's content. In the case where the first and second generative model are trained on images of different categories, the unauthorized user may be further confused when trying to access the first user's content by being forced to choose between two unrelated synthetic images—thereby further protecting sensitive data that may be included in the first user's personal images by not giving away a category of what may be associated with the first user. For instance, if an unauthorized user is presented with two synthetic images, each representing a cat, the unauthorized user may gain additional knowledge about the first user by assuming the first user must have a pet cat.

Additionally or alternatively, the system may delete the first plurality of images from the user device after the first generative model is trained. By deleting the first plurality of images after the first generative model has been trained, the system may achieve the technical benefit of alleviating storage and privacy concerns by not storing the data known to the users. For example, subsequent to training the first generative model with the first plurality of images, the first generative model no longer needs the first plurality of images. Therefore, the first plurality of images may be deleted from user device 322 (FIG. 3) or user terminal 324 (FIG. 3) thereby increasing the amount of available storage on user device 322 (FIG. 3) or user terminal 324 (FIG. 3) for further operations performed on the respective device or terminal. Additionally, the system need only store the first generative model as opposed to storing the first plurality of images. In this way, sensitive data included in the first plurality of images may be preserved by the system not having to transmit the first plurality of images via communication paths 328, 330, and 332 (FIG. 3) which may be prone to third-party attacks or hacking, and the system only needing to store the model to generate the synthetic images.

At step 510, process 500 generates (e.g., using one or more components of system 300 (FIG. 3)) a first subset of synthetic images. For example, the system may generate a first subset of synthetic images using the first generative model. Additionally or alternatively, the system may generate a second subset of synthetic images using the second generative model.

At step 512, process 500 generates for display (e.g., using one or more components of system 300 (FIG. 3)) a set of images to the first user including the first synthetic image. For example, the system may generate for display, on the user device, a set of images to the first user, wherein the set of images includes a first synthetic image of the first subset of synthetic images and a second synthetic image that is not of the first subset of synthetic images. In some embodiments, the system may generate for display, on the user device, the second synthetic image. For example, the second synthetic image is generated via the second generative model, wherein the second generative model uses images corresponding to the second user. In this way, the first synthetic image may be based on the first user's own personal images and the second synthetic image may be based images corresponding to the second user—thereby ensuring that the first synthetic image resembles at least one of the first user's own personal images and that an unauthorized user trying to access the first user's content cannot simply guess which image of the first and second synthetic image is the image known to the first user.

Additionally or alternatively, the system further trains the first generative model using a third plurality of images to generate synthetic images representing images that correspond to the category's images, and wherein the third plurality of images do not correspond to the first user. For example, the third plurality of images may be of stock images corresponding to the category (e.g., a cat). In this way, the first generative model may be pre-trained on images that generally resemble a cat, but not identical to the first user's own cat, to generate more realistic-looking cat's. Additionally, in this way, the first generative model's training time may be reduced due to the first generative model being pre-trained on such stock photos. For example, since the first generative model may be pre-trained to generate general images of a cat, the first generative model's parameters may have already learned the basic features required to generate general images of cats and may only need to update its parameters to learn more specific features of the first user's images of the first user's cats.

Additionally or alternatively, prior to the first generative model being trained using the first plurality of images, the system may obtain parameters of a third generative model corresponding to the category, wherein the third generative model is trained using a fourth plurality of images. The system may then use parameters of the third generative model in the first generative model and train the first generative model with the parameters of the third generative model using the first plurality of images to generate synthetic images representing images that correspond to the category's images. The system may then generate the first subset of synthetic images using the first generative model. For example, the third generative model may be a generic model that generates synthetic images of a general cat. The first generative model may then use the parameters of the third generative model to more efficiently generate synthetic images that resemble the user's own personal cat. In this way, the system may utilize transfer learning to help generate synthetic images that resemble the user's own personal images in a more efficient manner—thereby reducing the amount of training time the first generative model may require to generate synthetic images resembling the user's own personal images.

Additionally or alternatively, the system may compare the first synthetic image to an original image of the first plurality of images to determine a level of similarity. The system may then compare the level of similarity to a threshold level of similarity, and in response to determining that the level of similarity does not equal or exceed the threshold level of similarity, the system may select the first synthetic image for display in the set of images. For example, a level of similarity may represent how closely related the first synthetic image and the original image are, if the same object depicted in the first synthetic image is the same object depicted in the original image, what common properties between the first synthetic image and the original image exists, and so on. The level of similarity may be expressed in a quantitative fashion (e.g., a score, number, etc.). Alternatively or additionally, the level of similarity may be expressed in a qualitative fashion (e.g., "close", "identical", "different", etc.). The level of similarity may be determined by comparing pixel values of the first synthetic image to the pixel values of the original image. As another example, the level of similarity may be determined by comparing a group of pixel values of the first synthetic image to a corresponding group of pixel values of the original image. Furthermore, the level of similarity may be determined via machine learning models such as (but not limited to) artificial neural networks, convolutional neural networks, recurrent neural networks, deep neural networks, or other machine learning models to determine features that the synthetic image and the original image have in common. Additionally, these machine learning models may correlate a level of similarity (e.g., a score, value, number, etc.) between the synthetic image and the original image based on the number of features in common. Moreover, for example, by comparing the first synthetic image to an original corresponding image based on similarity, the system can ensure that an unauthorized user cannot simply guess which image is the synthetic image corresponding to the first user. By comparing the level of similarity that is not equal to or is exceeding the threshold level of similarity, the system prevents an unauthorized user from recognizing a "deep fake" image and selecting the first synthetic image to gain access to the first user's content. Also, in this way, the system may overcome privacy concern issues by ensuring the first synthetic image is not identical to the corresponding original image—thereby protecting any sensitive data found in the original image (e.g., the user's kids, home address, place of work, other identifying features, etc.).

Additionally or alternatively, these machine learning modules may detect deep fake images. Deep fakes are images that attempt to appear as though they are an original image, but also include features that make the image appear fake. For example, these images often include image features that appear unnatural as compared to an original image such as pixelated borders, gray-scale pixels located in positions they should not be, missing shadows, etc. Based on the issue of deep fakes, the system may utilize the aforementioned machine learning models to detect a deep fake image before generating, for display, the first or second synthetic image to the user to mitigate unauthorized users from easily guessing which synthetic image is the correct image to select for authentication. For example, the system may flag a synthetic image it believes to be a deep fake and select another synthetic image of the first subset of synthetic images or the second subset of synthetic images for display to the user to mitigate security concerns. These machine learning models may utilize edge detection, gray-scale analysis, GAN fingerprint, digital signature detection, shadow detection, or other forms of detecting deep fake images.

At step 514, process 500 receives (e.g., using one or more components of system 300 (FIG. 3)) a first user input selecting the first synthetic image. For example, the first user may select the first synthetic image as a part of an authentication mechanism to allow access to the first user's content. For example, the first user may select the first synthetic image 104 to authenticate the first user for access to the first user's content (FIG. 1). For example, the system may determine that the first synthetic image 104 corresponds to the first user while the second synthetic image 106 does not correspond to the first user (FIG. 1).

Additionally or alternatively, the authentication mechanism may be a password the first user knows and that an unauthorized user does not know. For instance, the password may include a string of characters that the user has set in advance to access the first user's content. In the case that a first user incorrectly selects the second synthetic image 106 (e.g., the image that does not correspond to the first user), then a password interface may be generated on user interface 100 (FIG. 1) to allow the first user to authenticate themself for access to their content.

Additionally or alternatively, the authentication mechanism may be a user device related security mechanism (e.g., token-based, digital signature-based, user device I.D. based, etc.). For example, the user device may be associated with a digital token that may be provided to the authentication mechanism to authenticate the first user to access their content. Furthermore, the user device the first user is using may be associated with a particular identification number (e.g., IP address, device serial number, device footprint, etc.) such that the user device may provide this identification number to the authentication mechanism to allow the first user access to their content.

Additionally or alternatively, the authentication mechanism may be a biometric based authentication mechanism. For example, the first user may provide the first user's fingerprint, retinal scan, iris scan, face, voice, or other biometric data to the system for authentication. For instance, biometric data may be pre-stored in a database in cloud components 310, user device 322, or user terminal 324 (FIG. 3). Once the first user provides biometric data to the system, the system may compare the provided biometric data to the pre-stored biometric data to determine a match between the biometric data. Upon successfully determining a match between the biometric data, the system may authenticate the first user.

At step 516, process 500 authenticates (e.g., using one or more components of system 300 (FIG. 3)) the first user. For example, the system may, in response to the first user input, authenticate the first user. For instance, because the first synthetic image 104 corresponds to the first user (e.g., via being generated based on the first user's own images), when the user selects the first synthetic image, the system determines that the selection is a correct selection. In this way, the system provides for improved authentication of users and makes it challenging for unauthorized users to simply guess which image of the set of images displayed to the unauthorized users is the synthetic image that is known to the first user. For example, the first synthetic image may be generated based on cat images of the user's own cat and the user's own cat may include an identifying feature of a spot on its fur as in the first synthetic image 104 (FIG. 1). The first user knows that the first synthetic image 104 resembles his own pet cat and that the second synthetic image 106 is merely a general image of a cat (FIG. 1). Based on this knowledge, the first user may authenticate themselves as the true user of the system (for access to their content) and an unauthorized user may not be privy to such knowledge (e.g., that the first user's cat has a spot on its fur). Thus, the unauthorized user may be challenged by making a correct determination of which image of the set of images displayed will allow access to the first user's content because of how similar the images are in combination with not knowing identifying features of the first user's pet cat.

Additionally or alternatively, the system may receive a second user input selecting the second synthetic image. In response to receiving the second user input, the system may generate for display, on the user device, a new set of images to the first user, wherein the new set of images includes a third synthetic image of the first subset of synthetic images and a fourth synthetic image that is not of the first subset of synthetic images. The system may then receive a third user input selecting the third synthetic image and in response to receiving the third user input, authenticate the first user. For example, the second user input selecting the second synthetic image may be the incorrect synthetic image to authenticate the first user. Based on the second user input being the incorrect selection, the system may generate a new set of images as a fall back authentication mechanism. In this way, the system may generate the new set of images such that the third synthetic image resembles the user's own personal images, and the fourth synthetic image does not resemble the user's own personal images—thereby allowing the first user to re-authenticate themselves based on the first user selecting the third synthetic image. In this way, the system ensures that the first user is not immediately denied access to their content and will have a chance to reauthenticate themselves. Furthermore, in this way, the system provides additional security by requiring an unauthorized user to have to choose amongst similar synthetic images again, thereby inducing further frustration and making it increasingly challenging to gain access to the first user's content.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-4 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising generating a synthetic image based on a plurality of images corresponding to the user, wherein the user is authenticated by selecting the synthetic image based on data known to the user without storing the data known to the users.

2. A method, the method comprising retrieving, a first plurality of images corresponding to a first user; categorizing the first plurality of images into a plurality of categories, wherein the first plurality of images is categorized into the plurality of categories based on objects depicted in the first plurality of images; selecting a category from the plurality of categories; retrieving a first generative model corresponding to the category, wherein the first generative model is trained using the first plurality of images to generate synthetic images representing images that correspond to the category's images; generating a first subset of synthetic images using the first generative model; generating for display, a set of images to the first user, wherein the set of images includes a first synthetic image of the first subset of synthetic images and a second synthetic image that is not of the first subset of synthetic images; receiving a first user input selecting the first synthetic image; and in response to the first user input, authenticating the first user.

3. A method for facilitating secure authentication of users based on data known to the users over remote communication networks without storing the data known to the users, the method comprising: retrieving, via a user device, a first plurality of images corresponding to a first user; categorizing the first plurality of images into a plurality of categories, wherein the first plurality of images is categorized into the plurality of categories based on objects depicted in the first plurality of images; selecting a category from the plurality of categories; retrieving, via the user device, a first generative model corresponding to the category, wherein the first generative model is trained using the first plurality of images to generate synthetic images representing images that correspond to the category's images; generating a first subset of synthetic images using the first generative model; generating for display, on the user device, a set of images to the first user, wherein the set of images includes a first synthetic image of the first subset of synthetic images and a second synthetic image that is not of the first subset of synthetic images; receiving a first user input selecting the first synthetic image; and in response to the first user input, authenticating the first user.

4. The method of any one of the preceding embodiments, further comprising: retrieving a second generative model corresponding to the category, wherein the second generative model is trained using a second plurality of images to generate synthetic images representing images that correspond the category's images, wherein the second plurality of images corresponds to a second user; generating a second subset of synthetic images using the second generative model; and generating for display, on the user device, the second synthetic image.

5. The method of any one of the preceding embodiments, wherein retrieving the first plurality of images corresponding to the first user, further comprises: determining a set of available images corresponding to the first user; determining a respective time stamp for each image of the set of available images; and filtering each image of the set of available images based on the respective time stamp to determine the first plurality of images.

6. The method of any one of the preceding embodiments, wherein the first generative model is further trained using a third plurality of images to generate synthetic images representing images that correspond to the category's images, and wherein the third plurality of images do not correspond to the first user.

7. The method of any one of the preceding embodiments, further comprising: receiving a second user input selecting the second synthetic image; in response to receiving the second user input, generating for display, on the user device, a new set of images to the first user, wherein the new set of images includes a third synthetic image of the first subset of synthetic images and a fourth synthetic image that is not of the first subset of synthetic images; receiving a third user input selecting the third synthetic image; and in response to receiving the third user input, authenticating the first user.

8. The method of any one of the preceding embodiments, further comprising: prior to the first generative model being trained using the first plurality of images, obtaining parameters of a third generative model corresponding to the category, wherein the third generative model is trained using a fourth plurality of images; using the parameters of the third generative model in the first generative model; training the first generative model with the parameters of the third generative model using the first plurality of images to generate the synthetic images representing images that correspond to the category's images; and generating the first subset of synthetic images using the first generative model.

9. The method of any one of the preceding embodiments, further comprising deleting the first plurality of images from the user device after the first generative model is trained.

10. The method of any one of the preceding embodiments, further comprising: retrieving social media profile data corresponding to the first user; retrieving images corresponding to the social media profile data; and determining, based on the images corresponding to the social media profile data, the first plurality of images.

11. The method of any one of the preceding embodiments, further comprising: retrieving the plurality of categories of the first plurality of images; determining a number of images included in each category of the plurality of categories; and selecting a category of the first plurality of images, wherein the category is selected based on the number of images included in the category being greater than a pre-determined number of images.

12. The method of any one of the preceding embodiments, further comprising: comparing the first synthetic image to an original image of the first plurality of images to determine a level of similarity; compare the level of similarity to a threshold level of similarity; and in response to determining that the level of similarity does not equal or exceed the threshold level of similarity, selecting the first synthetic image for display in the set of images.

13. A tangible, non-transitory, machine-readable medium storing instructions that, when executed by a data processing apparatus, cause the data processing apparatus to perform operations comprising those of any of embodiments 1-12.

14. A system comprising: one or more processors; and memory storing instructions that, when executed by the processors, cause the processors to effectuate operations comprising those of any of embodiments 1-12.

15. A system comprising means for performing any of embodiments 1-12.

What is claimed:
1. A system for facilitating secure authentication of users based on data known to the users over remote communication networks without storing the data known to the users, the system comprising:
memory configured to store a plurality of generative models and a plurality of images;
control circuitry configured to:
retrieve a first plurality of images corresponding to a first user;

categorize the first plurality of images into a plurality of categories, wherein the first plurality of images are categorized into the plurality of categories based on objects depicted in the first plurality of images;

select a category from the plurality of categories;

retrieve a first generative model corresponding to the category, wherein the first generative model is trained using the first plurality of images to generate synthetic images representing images that correspond to the category's images;

generate a first subset of synthetic images using the first generative model, wherein the first subset of images includes a first synthetic image;

delete, from the memory, the first plurality of images after the first generative model is trained; and user device I/O circuitry configured to generate for display, on the user device, a set of images to the first user, wherein the set of images includes the first synthetic image and a second synthetic image that is not of the first subset of images, and herein a first user selection of the first synthetic image causes authentication of the first user.

2. A method for facilitating secure authentication of users based on data known to the users over remote communication networks without storing the data known to the users, the method comprising:

retrieving, via a user device, a first plurality of images corresponding to a first user;

categorizing the first plurality of images into a plurality of categories, wherein the first plurality of images are categorized into the plurality of categories based on objects depicted in the first plurality of images;

selecting a category from the plurality of categories;

retrieving, via the user device, a first generative model corresponding to the category, wherein the first generative model is trained using the first plurality of images to generate synthetic images representing images that correspond to the category's images;

generating a first subset of synthetic images using the first generative model;

generating for display, on the user device, a set of images to the first user, wherein the set of images includes a first synthetic image of the first subset of synthetic images and a second synthetic image that is not of the first subset of synthetic images;

receiving a first user input selecting the first synthetic image; and in response to the first user input, authenticating the first user.

3. The method of claim 2, further comprising:

retrieving a second generative model corresponding to the category, wherein the second generative model is trained using a second plurality of images to generate synthetic images representing images that correspond the category's images, wherein the second plurality of images corresponds to a second user;

generating a second subset of synthetic images using the second generative model; and generating for display, on the user device, the second synthetic image.

4. The method of claim 2, wherein retrieving the first plurality of images corresponding to the first user, further comprises:

determining a set of available images corresponding to the first user;

determining a respective time stamp for each image of the set of available images; and filtering each image of the set of available images based on the respective time stamp to determine the first plurality of images.

5. The method of claim 2, wherein the first generative model is further trained using a third plurality of images to generate synthetic images representing images that correspond to the category's images, and wherein the third plurality of images do not correspond to the first user.

6. The method of claim 2, further comprising:

receiving a second user input selecting the second synthetic image;

in response to receiving the second user input, generating for display, on the user device, a new set of images to the first user, wherein the new set of images includes a third synthetic image of the first subset of synthetic images and a fourth synthetic image that is not of the first subset of synthetic images;

receiving a third user input selecting the third synthetic image; and in response to receiving the third user input, authenticating the first user.

7. The method of claim 2, further comprising:

prior to the first generative model being trained using the first plurality of images, obtaining parameters of a third generative model corresponding to the category, wherein the third generative model is trained using a fourth plurality of images;

using the parameters of the third generative model in the first generative model;

training the first generative model with the parameters of the third generative model using the first plurality of images to generate the synthetic images representing images that correspond to the category's images; and generating the first subset of synthetic images using the first generative model.

8. The method of claim 2, further comprising deleting the first plurality of images from the user device after the first generative model is trained.

9. The method of claim 2, further comprising:

retrieving social media profile data corresponding to the first user;

retrieving images corresponding to the social media profile data; and determining, based on the images corresponding to the social media profile data, the first plurality of images.

10. The method of claim 2, further comprising:

retrieving the plurality of categories of the first plurality of images;

determining an amount of images included in each category of the plurality of categories; and selecting a category of the first plurality of images, wherein the category is selected based on the amount of images included in the category being greater than a pre-determined amount of images.

11. The method of claim 2, further comprising:

selecting the first synthetic image for display in the set of images based on a similarity of the first synthetic image to an original image of the first plurality of images.

12. A non-transitory computer readable medium for facilitating secure authentication of users based on data known to the users over remote communication networks without storing the data known to the users comprising instructions that, when implemented by one or more processors, cause operations comprising:

retrieving, via a user device, a first plurality of images corresponding to a first user;

categorizing the first plurality of images into a plurality of categories, wherein the first plurality of images are categorized into the plurality of categories based on objects depicted in the first plurality of images;

selecting a category from the plurality of categories;

retrieving, via the user device, a first generative model corresponding to the category, wherein the first generative model is trained using the first plurality of images to generate synthetic images representing images that correspond to the category's images;

generating a first subset of synthetic images using the first generative model;

generating for display, on the user device, a set of images to the first user, wherein the set of images includes a first synthetic image of the first subset of synthetic images and a second synthetic image that is not of the first subset of synthetic images;

receiving a first user input selecting the first synthetic image; and in response to the first user input, authenticating the first user.

13. The non-transitory computer readable medium of claim 12, wherein the instructions further cause operations comprising:

retrieving a second generative model corresponding to the category, wherein the second generative model is trained using a second plurality of images to generate synthetic images representing images that correspond the category's images, wherein the second plurality of images corresponds to a second user;

generating a second subset of synthetic images using the second generative model; and generating for display, on the user device, the second synthetic image.

14. The non-transitory computer readable medium of claim 12, wherein the first generative model is further trained using a third plurality of images to generate synthetic images representing images that correspond to the category's images, and wherein the third plurality of images do not correspond to the first user.

15. The non-transitory computer readable medium of claim 12, wherein the instructions further cause operations comprising:

receiving a second user input selecting the second synthetic image;

in response to receiving the second user input, generating for display, on the user device, a new set of images to the first user, wherein the new set of images includes a third synthetic image of the first subset of synthetic images and a fourth synthetic image that is not of the first subset of synthetic images;

receiving a third user input selecting the third synthetic image; and in response to receiving the third user input, authenticating the first user.

16. The non-transitory computer readable medium of claim 12, wherein the instructions further cause operations comprising:

prior to the first generative model being trained using the first plurality of images, obtaining parameters of a third generative model corresponding to the category, wherein the third generative model is trained using a fourth plurality of images;

using the parameters of the third generative model in the first generative model;

training the first generative model with the parameters of the third generative model using the first plurality of images to generate the synthetic images representing images that correspond to the category's images; and generating the first subset of synthetic images using the first generative model.

17. The non-transitory computer readable medium of claim 12, wherein the instructions further cause operations comprising deleting the first plurality of images from the user device after the first generative model is trained.

18. The non-transitory computer readable medium of claim 12, wherein the instructions further cause operations comprising:

retrieving social media profile data corresponding to the first user;

retrieving images corresponding to the social media profile data; and determining, based on the images corresponding to the social media profile data, the first plurality of images.

19. The non-transitory computer readable medium of claim 12, wherein the instructions further cause operations comprising:

retrieving the plurality of categories of the first plurality of images;

determining an amount of images included in each category of the plurality of categories; and selecting a category of the first plurality of images, wherein the category is selected based on the amount of images included in the category being greater than a pre-determined amount of images.

20. The non-transitory computer readable medium of claim 12, wherein the instructions further cause operations comprising:

selecting the first synthetic image for display in the set of images based on a similarity of the first synthetic image to an original image of the first plurality of images.

* * * * *